United States Patent [19]

Mills

[11] 4,336,094

[45] Jun. 22, 1982

[54] SYSTEM FOR AND METHOD OF LAMINATING

[75] Inventor: Leland F. Mills, Dunbarton, N.H.

[73] Assignee: Crathern Engineering Co., Inc., Contoocook, N.H.

[21] Appl. No.: 268,198

[22] Filed: May 29, 1981

[51] Int. Cl.³ .............................................. B32B 31/00

[52] U.S. Cl. ........................................ 156/299; 412/3; 156/364; 156/162; 271/227

[58] Field of Search ........................ 156/364, 556–563, 156/299–300; 11/2; 271/227

[56] References Cited

U.S. PATENT DOCUMENTS

| | | | |
|---|---|---|---|
| 2,596,068 | 5/1952 | Buneh et al. | 11/2 X |
| 2,925,612 | 2/1960 | Schramm | 11/2 |
| 3,389,038 | 6/1968 | Robison | 156/562 X |
| 3,522,129 | 7/1970 | Crathern | 156/364 |
| 3,817,157 | 6/1974 | Andersen | 156/364 |
| 3,897,945 | 8/1975 | Faltot | 156/364 X |
| 4,129,914 | 12/1978 | Jahn | 11/2 |

*Primary Examiner*—David A. Simmons

*Attorney, Agent, or Firm*—Schiller & Pandiscio

[57] ABSTRACT

The disclosed apparatus and method automatically secures three substantially planar sheet members in registration with respective portions of a sheet of material such that (1) one of the sheet members is centered between the other two, (2) the outer oppositely disposed edges of the other two are mutually spaced from one another by a predetermined distance as well as precisely positioned with respect to a first edge of the sheet of material, and (3) another edge of each of the other two sheet members is substantially aligned with the other and with an edge of the center sheet member, all of the aligned edges of the members being precisely positioned with respect to a second edge of the sheet.

19 Claims, 17 Drawing Figures

Fig.7A
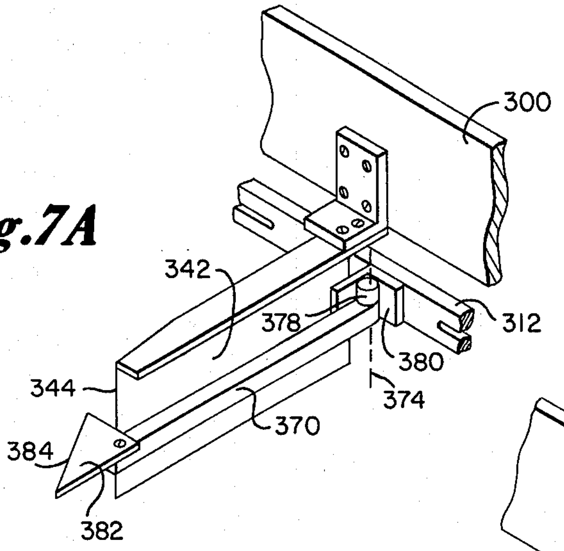
Fig.7B
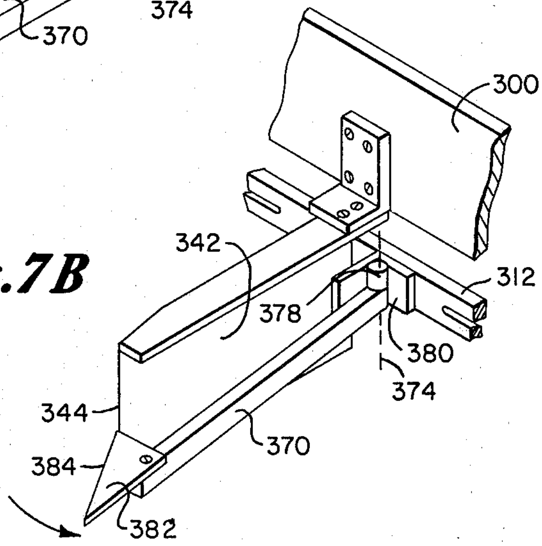
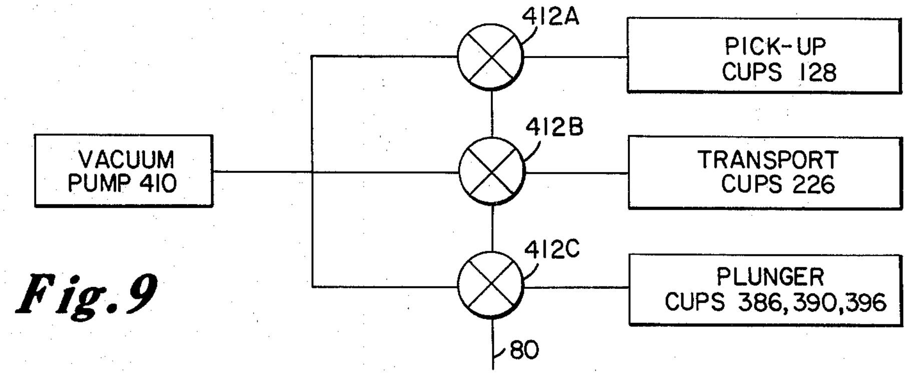
Fig.9
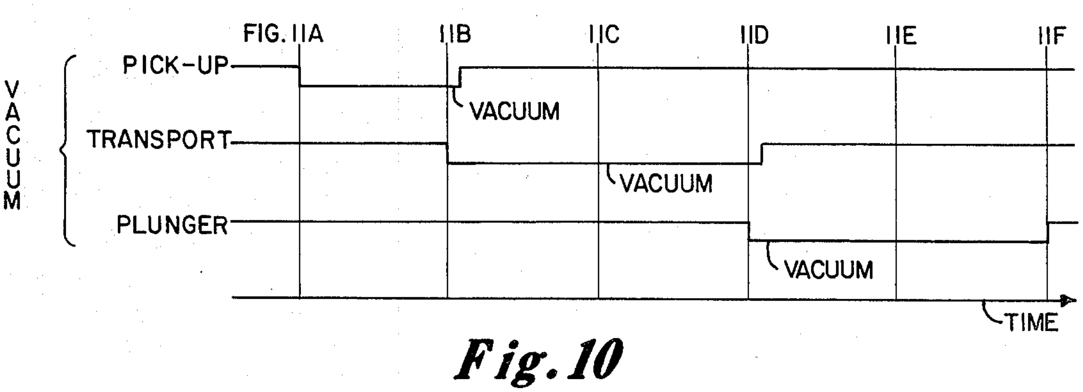
Fig.10

SYSTEM FOR AND METHOD OF LAMINATING

The present invention relates generally to apparatus for and methods of laminating sheet materials, and more particularly to apparatus for and methods of aligning and laminating three backing support sheet members in registration with respective portions of a cover sheet of material.

Various apparatus are commercially available, as well as methods are known, for making two piece laminates, such as game boards, each having a backing sheet member or blank secured by adhesive to one side of a cover sheet of material. The cover sheet of material (for convenience hereinafter referred to as a "wrapper") is typically preprinted on its other side and is usually wrapped about the edges of the backing member. Some laminates, such as those formed in the manufacture of record jackets, require two backing sheet members to be secured in registration with different portions of a wrapper. The three piece laminate can then be folded and appropriately wrapped to form the finished product.

As described in U.S. Pat. Nos. 3,400,031 and 3,522,129, both assigned to the present assignee, when making laminates of the type including one support sheet member, it is necessary to properly align at least one edge of the backing sheet member with respect to the wrapper before bringing the two into contact with one another. Similarly, when making the two support sheet laminates it is likewise necessary to align the two support sheet members with at least one edge of the wrapper so that any preprinted material on the opposite side of the wrapper to which the support sheets are attached will be properly positioned with respect to the support sheets. For example, when making record jackets, identification information is often provided on one edge of the jacket so that when the jackets are stacked against one another they still can be easily identified. Failure to properly align the wrapper and backing sheet members will result in misregistration of the identifying information.

A system which has been found to be accurate in providing high speed alignment and lamination of the one and two backing sheet members with a wrapper is described in U.S. Pat. Nos. 3,400,031 and 3,522,129. The system generally includes a high speed conveyor belt assembly so that the laminate can be made accurately at high speeds. A commercially available system based upon U.S. Pat. Nos. 3,400,031 and 3,522,129 is currently being sold by the present assignee as the "FB-1 Spotter."

Due to the present high capital costs of making bookcases (which typically include a wrapper, two cover backing sheet members and a spine backing sheet member all secured in a spatial relationship with respect to one another and to separate portions of an adhesively coated surface of the wrapper) the need has arisen for a relatively inexpensive, and accurate high speed, automatic technique of and system for laminating these three backing sheet members to a wrapper. In such an automatic system and technique it is often necessary to accurately register the cover and spine backing sheet members to select and different portions of one side of an adhesively coated wrapper. For example, printed material may be preprinted on the wrapper and may be required to be precisely located on the spine of the resulting bookcase both with respect to the back and front covers as well as the top and bottom edges of the spine. In this manner when the pages of text of a book are bound to the bookcase the preprinted information appearing on the spine of each volume of the same book will appear properly positioned with respect to all of the others.

Accordingly, an object of the present invention is to provide an improved apparatus for and technique of precisely laminating three backing sheet members in registration with three corresponding portions of an adhesive coated sheet of material.

Another object of the present invention is to provide an improved automatic system for and method of laminating three backing sheet members to a wrapper, the system and method including many advantages of the system described and method suggested in U.S. Pat. Nos. 3,400,031 and 3,522,129.

And another object of the present invention is to provide an improved system for and method of aligning and laminating in registration three backing sheet members to one side of a wrapper having preprinted material on the other side so that the preprinted material is precisely positioned with respect to the backing sheet members.

Still another object of the present invention is to provide a relatively inexpensive, high speed, automatic system for use with a conveyor for making laminates of the type including three backing sheet members secured to a wrapper.

Yet another object of the present invention is to provide an improved apparatus for and method of securing three backing sheet members to select portions of a sheet of material such that one of the sheet members is precisely centered between the other two.

And still another object of the present invention is to provide a modified apparatus of the FB-1 Spotter type for making laminates including three backing sheet members.

And yet another object of the present invention is to provide an improved apparatus for and method of making bookcases.

These and other objects are achieved by an improved system for and method of securing three substantially planar sheet members in registration with respective portions of a surface of a sheet of material. One of the sheet members is precisely centered between the other two. In the preferred embodiment each member has an edge substantially aligned with an edge of the other members and positioned with respect to an edge of the sheet; and the oppositely disposed edges of the other two sheet members are mutually spaced from one another by a preselected distance as well as positioned relative to an adjacent edge of the sheet. The preferred system comprises means for moving the other two sheet members relative to one another, so that the outer oppositely disposed edges of the other two sheet members are moved from a mutually spaced distance greater than the preselected distance to the preselected distance as the backing sheet members are moved into a position spaced from the sheet of material where they can be aligned with the respective portions of the sheet of material. The system also includes means for moving the sheet members into contact with the respective portions of the sheet of material to form said laminate.

Other objects of the present invention will in part be obvious and will in part appear hereinafter. The invention accordingly comprises the apparatus possessing the construction, combination of elements, and arrangement of parts, and the processes involving the several steps and the relation and order of one or more of such steps with respect to each of the others, which are exemplified in the following detailed disclosure and the scope of the application all of which will be indicated in the claims.

For a fuller understanding of the nature and objects of the present invention, reference should be had to the following drawings wherein:

FIGS. 7A and 7B are perspective views of details of the alignment bar and main frame member, partially cut away, of the articulating frame assembly;

FIG. 9 is a block diagram of the vacuum system of the apparatus of the present invention;

FIG. 10 is a timing diagram of the operation of the vacuum system of FIG. 9.

In the following description like reference characters on the drawing indicate like parts in the several figures.

Figure 1:
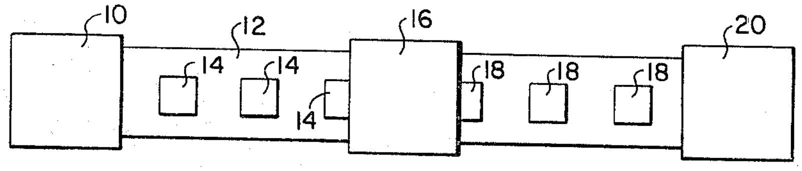
FIG. 1 is a plan view, in schematic form, of an entire system for making cases of the type described herein.

In FIG. 1, the system for making laminates of the type described herein, includes first apparatus 10, hereinafter referred to for convenience as a "gluer", for periodically providing to conveyor belt 12 a sheet 14 of material (the "wrapper") having its upper exposed side provided with a coating of adhesive. The gluer 10 is of a type well known in the art and, for example, may be the Model 405 Gluer, manufactured by FMC of Horsham, Pa. The belt is preferably of the type which is provided with perforations so that a vacuum can be applied below the belt in order to securely hold the sheet 14 in position on the belt. The belt is preferably intermittently stopped so that each sheet 14 can be brought into a laminating station where the sheet is held in a stationary position with respect to alignment and laminating apparatus 16. Once the sheet 14 is in the stationary position, backing sheet members are properly aligned with and secured to respective portions of the sheet to provide the laminate 18. Each laminate 18 is subsequently transferred by belt 12 from the apparatus 16 to apparatus 20 for wrapping the edges of each sheet 14 around the corresponding edges of the backing sheet members as will be more evident from the following description. The wrapper 20 is also well known in the art, and for example, may be the four-sided wrapper currently available from the present assignee.

The present invention relates generally to an improved apparatus 16 for aligning and securing three backing sheet members to each sheet 14 and has particular utility in making bookcases of the type having a wrapper, front and back backing sheet members and a spine backing sheet member.

Figure 2:
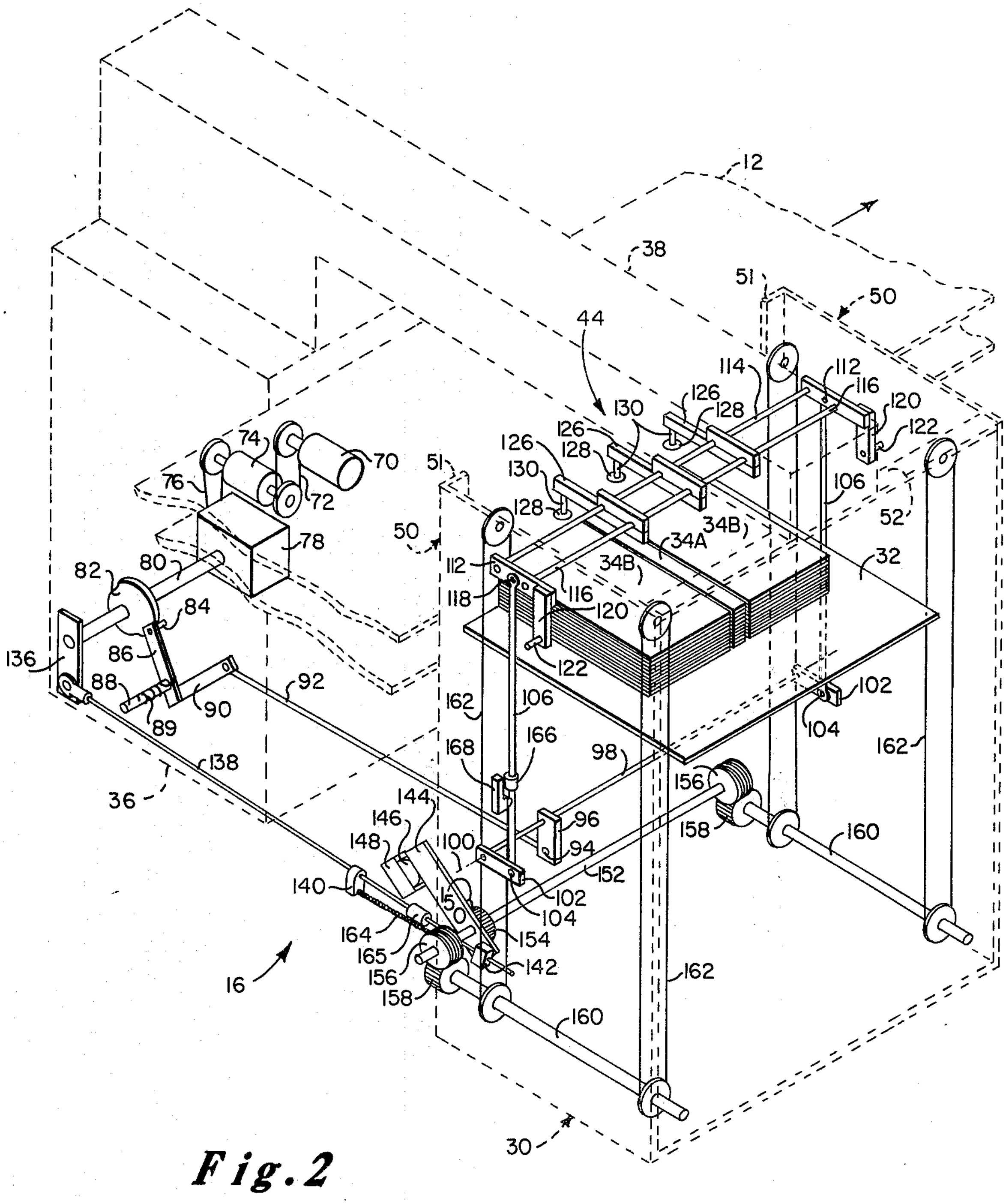
FIG. 2 is a perspective view of the stack elevating mechanism and the pick up mechanism of the laminating apparatus of the present invention.

The preferred apparatus 16 is shown and described with respect to FIG. 2 through FIGS. 11A–11F. As shown in FIG. 2, the apparatus generally includes a supply station 30 including a supply tray 32 for supporting a supply of backing sheet members 34 on one side of conveyor belt 12, and the power drive system generally disposed in compartment 36 on the opposite side of the belt from station 30. A bridging section 38 is disposed above the belt 12 between station 30 and compartment 36. The preferred apparatus 16 comprises means, including spacing elements 40 and 42 (shown in FIGS. 11A–11F), for positioning the three backing sheet members 34 on the tray 32 in a predetermined spatial relationship and means, including the lifting or pick-up assembly 44 (shown in FIG. 2 and FIGS. 11A–11F) for raising at least a portion of the three support members from their respective positions on the tray. The apparatus 16 also generally comprises means, including transport assembly 46, for transporting the three members (shown in FIGS. 3 and 11A–11F) and means, including articulating frame 48 (shown in FIG. 4 and FIGS. 11A–11F), for registering the three backing sheet members 34 with respect to one another and to the adhesive coated side of a sheet 14 positioned on belt 12 below, and for moving the sheet members into contact with the sheet. In the preferred embodiment pick up assembly 44 raises the leading edge of each sheet member 34 and transport assembly 46 holds the leading edge of each member as it moves the members toward the articulating frame 48. Accordingly, apparatus 16 also comprises means, including hold-up bar assembly 50 (shown in FIG. 5 and FIGS. 11A–11F), supporting the sheet members as transport assembly 46 moves the three sheet members from the pick-up assembly 44 to the articulating frame 48. The foregoing will become more evident with the following detailed description.

Referring to FIG. 2 station 30 includes a pair of partitions 50 provided with lips 51. Partitions 50 are disposed on opposite sides of the tray 32. Stations 30 also includes a support bar 52 disposed across the top of and connected to both partitions and supporting one end of bridging section 38.

Figure 11A:
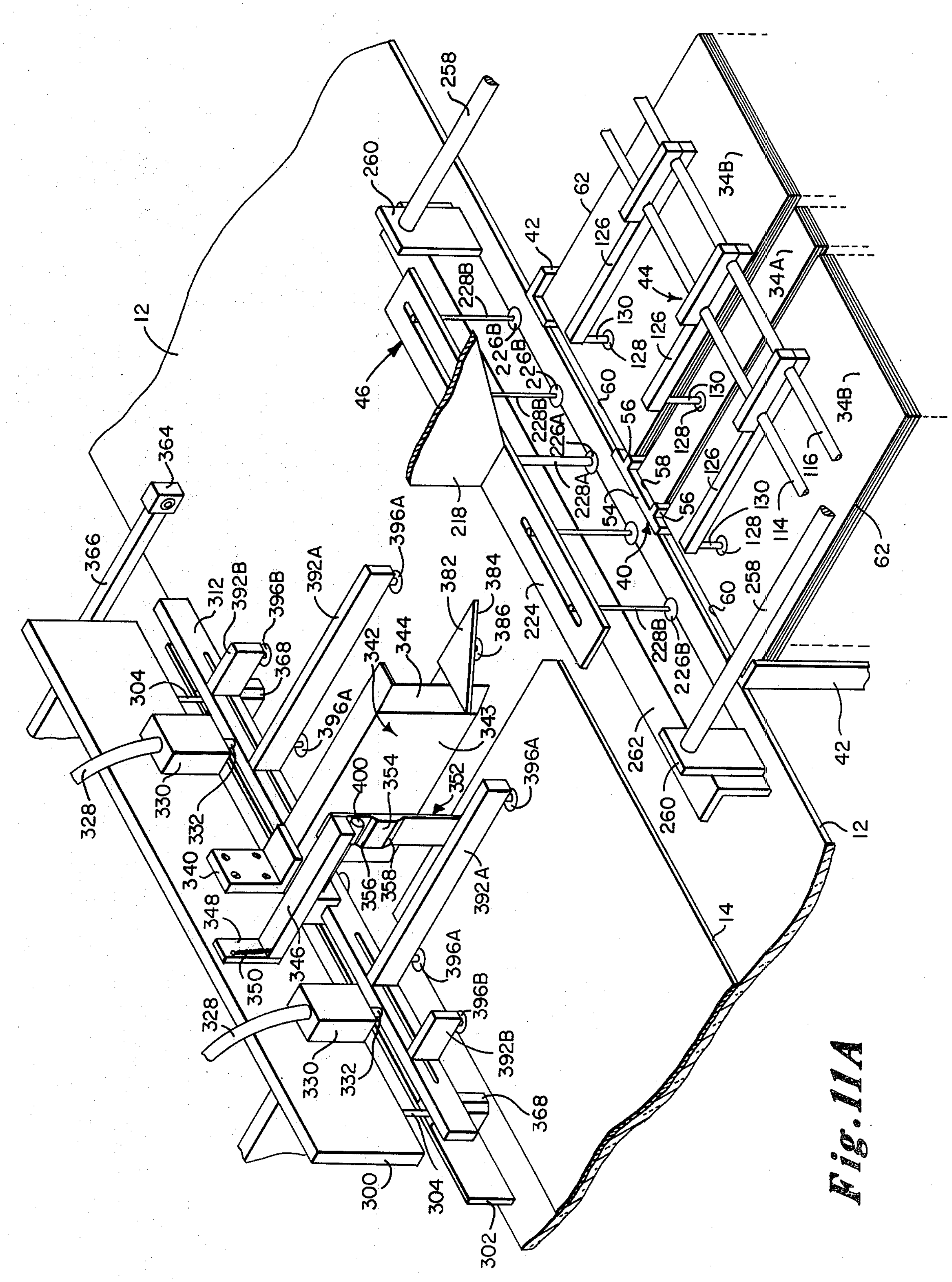
FIGS. 11A–11F illustrate further details as well as the operation of the system incorporating the present invention and the method of the present invention.

In FIG. 11A, the spacing elements 40 and 42 are provided between tray 30 and belt 12 so that members 34 can be positioned on the tray in three stacks (the center stack of members 34A and the remaining two stacks of members 34B), the stacks being arranged in a predetermined spatial relationship with one another as well as with the articulating frame 48. As shown in FIG. 11A, the center spacing element 40 is generally a flat plate 54 having a top edge adapted to be disposed just above the center stack of members 34A. Spacing element 40 also includes a pair of parallel spaced apart ribs 56 dispose on one side of the plate 54 so as to form with plate 54 a channel for receiving the leading edges 58 of the members 34A of the stack.

The spacing elements 42 are disposed on opposite sides of spacing element 40 and are generally of an L-shaped cross-section so that each forms with a rib 56 of the spacing element 40, a channel for receiving leading edges 60 of the members 34B of each stack. With the leading edges 58 of members 34A and the leading edges 60 of the members 34B all properly positioned against the respective portions of spacing elements 40 and 42, the width of each rib 56 and the spacing of spacing elements 42 are such that the outer oppositely disposed edges 62 of the members 34B are spaced apart by a predetermined distance for reasons which will be more evident hereinafter. In this regard, it should be appreciated that a spacing element 40 can be specifically provided for each type of laminate 18 to be made. Although not shown, means are provided for adjusting the relative position of each spacing element 42 with respect to the corresponding rib 56 so as to accommodate members 34B of different widths.

The pick-up assembly 44 and the means for driving the assembly are shown in FIG. 2. More particularly, a main drive shown in FIG. 2 is disposed in compartment 36 and comprises an electric motor 70 connected through a variable speed belt drive 72 to an electric brake and clutch 74. The latter is in turn connected through a belt drive 76 to a gear reducer 78. Gear reducer 78 is suitably coupled to drive the main timing cam shaft 80. Shaft 80 supports cam 82 which drives the cam follower 84 attached to pivot lever 86. The latter is secured to a pivot pin 88, which is pivotably mounted in any suitable manner in compartment 36 and is biased, for example, by spring 89 so that the follower 84 is biased against cam 82. A second lever 90 has one end secured to the end of lever 86, opposite the cam follower 84, and its other end pivotably secured to drive link 92. The opposite end of link 92 is pivotably secured at 94 to the drive arm 96. Drive arm 96 is secured to rotate drive shaft 98 in response to movement of the link 92 along its station 30 so as to rotate about its axis 100. A lift arm 102 is secured to each end of the shaft 98 so as to rotate with the shaft. Each arm 102 is pivotably attached at 104 to an end of lift link 106. The opposite end of each lift link 106 is pivotably secured at 118 to a support arm 112 of pick-up assembly 44.

The pair of support arms 112 of assembly 44 are provided for supporting at opposite ends, each of front and rear pick-up cup holder shafts 114 and 116 so that the shafts are generally parallel to one another and so that the shafts 114 are secured to the arms 112 at opposite sides of pivot points 118. Each arm 112 is secured (at its end opposite from shaft 114) to and is adapted to pivot with a pivot arm 120, which in turn pivots about the pivot pin 122, the latter being pivotably mounted in supply station 30. Assembly 44 also includes three arms 126 secured to both shafts 114 and 116 each positioned above a respective stack of members 34 on tray 32. A vacuum cup 128 is supported by a vacuum cup holder 130, which in turn is secured to each arm 126. The cups are all disposed substantially in the same plane, with each cup 128 made of a flexible material, such as rubber, so that when the cup contacts the respective member 34 and a suitable vacuum is applied through the corresponding holder 130, the member 34 can be lifted with the cup. Each holder 130 is made of a stiff material, such as metal, so that pressure can be applied by each arm 126 through the holder to force the respective cup against the member 34 so that the vacuum can be applied.

The pick-up assembly 44 and the means for driving the assembly operate as follows. Cam 82 rotates with the shaft 80. Follower 84 will responsively pivot about pin 88 causing levers 86 and 90 to pivot about the pin. Movement of lever 90 causes drive link 92 to move in its longitudinal dimension resulting in arm 96 pivoting, rotating shaft 98 about its axis 100. As shaft 98 rotates about its axis the support arms 112 pivot causing arms 126 to pivot about pins 122. Arms 126 pivot until the respective cups contact the top sheet member 34 of the corresponding stack. As will be evident hereinafter, as members 34 are individually removed from each stack, arms 126 will have a greater distance to pivot until the respective cups contact the top member of the respective stack. In order to insure the members 34 are within reach of the arms 126, as provided in the FB-1 spotter, means are provided for raising the tray 32 before the remaining members 34 are disposed too low for the reach of arms 126.

More particularly, as seen in FIG. 2, the cam shaft 80 is also connected to one end of a pile lift crank 136. The other end of crank 136 is pivotably connected to pile lift drive arm 138. Arm 138 is mounted to slide in a stationary mount 140, and slide in a block 142. Block 142 is pivotably secured to one end of ratchet arm 144. Arm 144 includes a pawl 150, and its opposite end is provided with a magnet head 146 shown secured to electromagnet 148. Arm 144 is secured to shaft 152 about a point between block 142 and magnet head 146. Shaft 152 is mounted in supply station 30 so as to rotate about its axis, and includes a ratchet gear 154. Shaft 150 also includes at its opposite ends, worm gears 156 for engaging worm gears 158. The latter each rotate a shaft 160, which in turn rotates chains 162 to raise tray 32 (the latter being secured to the chains). A bias spring 164 biases the ratchet arm 144 in a direction so as to pull magnet head 146 away from head 148 when no magnetic force is applied between the two. A collar 165 is provided on drive arm 138 between mount 140 and block 142. A collar 166 is also provided on one of the lift links 106 which is adapted to close microswitch 168. The latter is suitably connected to de-energize the magnet head 146 when switch 168 is closed.

In operation with each successive member 34 being removed from each stack on tray 32, the arms 126 will progressively move to a lower position with each stroke down to pick up the next set of members 34. With each stroke lift link 106 will move a greater amount until collar 166 closes microswitch 168. This deenergizes the magnet head 148, releasing magnet 146. Spring 164 therefore will pull the lower end of arm 144 so that the latter rotates about shaft 152. Pawl 150 is adapted to pass over gear 154 when arm 144 moves in this direction. The spring 164 pulls arm 144, sliding block 142 on drive arm 138 until it contacts collar 165. In the meantime drive arm 138 is driven toward block 142 by cam shaft 80 so that collar 165 pushes block 142 in an opposite direction causing arm 144 to begin rotating in an opposite direction. Pawl 150 then engages ratchet gear 154 causing shaft 152 to rotate until magnet 146 again contacts head 158. When pawl 150 engages gear 154 and shaft 152 rotates, shafts 160 rotate moving chains 162 so as to raise tray 32. The arms 126 of assembly 44 will thus have a shorter distance to travel. Consequently, collar 166 will have less distance to travel and will remain above switch 168 with the next downstroke of link 106. Thus, when arm 144 rotates to the point where magnet 146 contacts electromagnet 148 the two will be held together by magnetic force.

Figure 3:
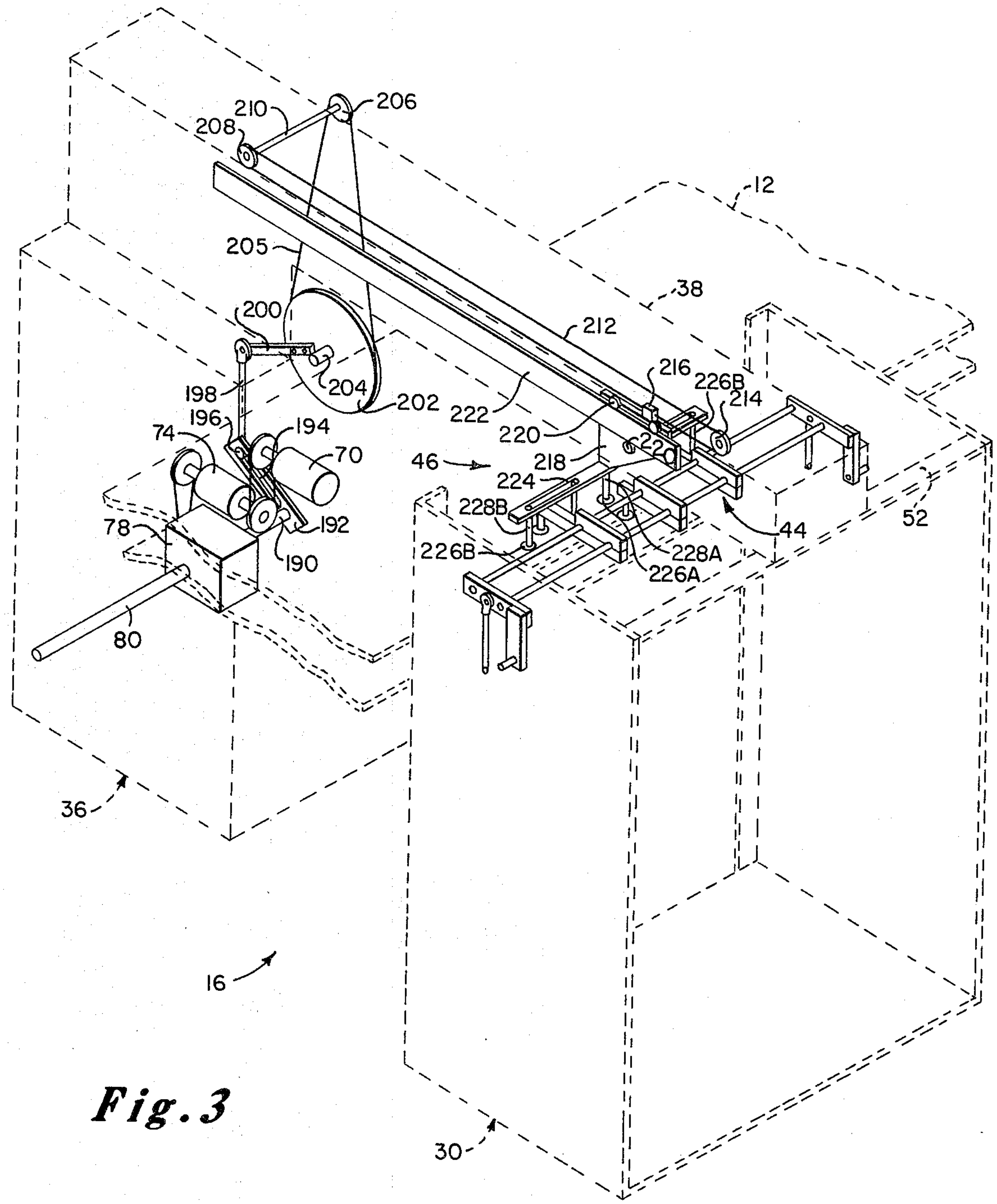
FIG. 3 is a perspective view, partially in schematic form, of the transport drive mechanism of the laminating apparatus employing the present invention.

The transport assembly 46 and the means for driving the assembly are shown in FIG. 3. A drive shaft 190 is driven by gear reducer 78. A transfer drive crank 192 is connected for rotation with shaft 190. Crank 192 is provided with slot 194 for receiving pin 196. The latter is connected at the end of drive link 198, the link being pivotably connected at its other end to the arm 200 which drives rock sprocket 202. The latter is rotatably secured to rotate about axle 204 and drives belt 205. Belt 205 in turn rotates driven sprocket 206 which in turn drives drive sprocket 208 through shaft 210. Drive sprocket 208 drives the transfer slide drive chain 212, which in turn rotates about idler sprocket 214 fixedly positioned for rotation above pick-up assembly 44. Chain 212 is provided with an attachment piece 216 secured to the transfer slide plate 218. Transfer slide plate 218 includes top and bottom rollers 220 adapted to roll on support bar 222 which extends through bridging section 38. Slide plate 218 supports transfer bar 224. Transfer bar 224 supports a center vacuum cup 226A and vacuum cup holder 228A, and a pair of cups 226B (one being shown in FIG. 3) and holders 228B on each side of center cup 226A. Cups 226A and 226B are identical to cups 128 of assembly 44 and are preferably all disposed in the same plane with one another as well as with cups 128 when the latter are in there upper position. For reasons which are described hereinafter, holder 228A is made of a rigid material such as metal, while holders 228B are made of a material flexible enough to allow the cups 226B connected thereto to move, at least to a limited extent, transversely to the general elongated direction of the holder, while they are rigid enough so that the cup can be pressed against a sheet member 34 and a vacuum applied.

In operation crank 192 rotates 360° with each rotation of shaft 190. With each 360° angular rotation of crank 192, the sprocket 202 rotates 90° one way, and 90° back causing the chain 212 to reciprocally rotate back and forth sufficiently such that the transfer bar 224 moves back and forth between (1) a first position where each pair of cups 226B are positioned adjacent a cup 128 of an arm 126 of the pick-up assembly 44 when cups 128 are in their upper position, while the center cup 226A is adjacent the cup 128 of the center arm 126 when the center cup is in its upper position, and (2) a second position wherein the transfer bar is positioned over the conveyor belt 12 adjacent the articulating frame 48.

Figure 5:
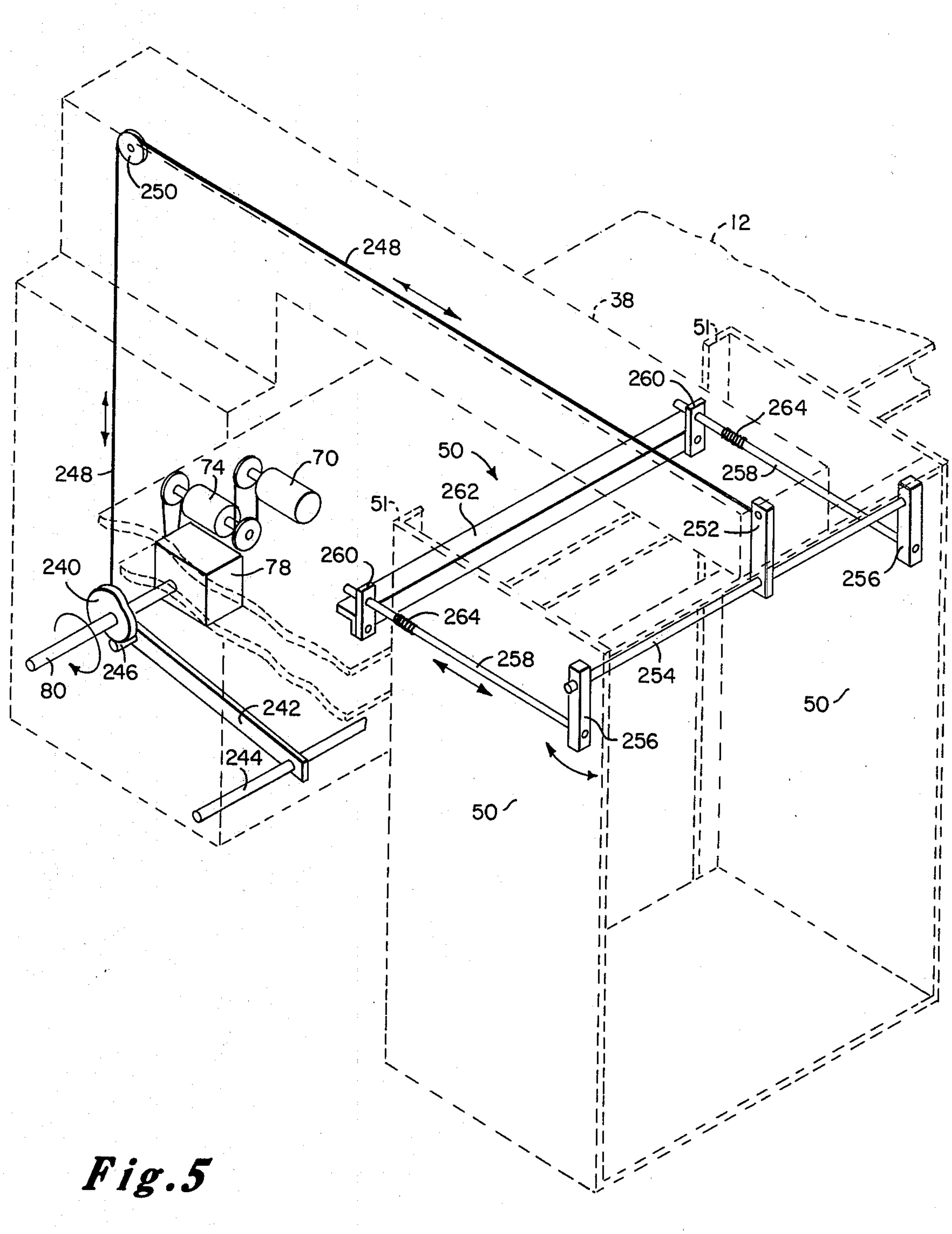
FIG. 5 is a perspective view, partially in schematic form, of the hold up bar drive mechanism of the laminating apparatus of the present invention.

The hold-up bar assembly 50 and the means for driving the assembly is shown in FIG. 5. The cam shaft 80 drive a hold-up cam 240. A hold-up cam arm 242 is secured at one end to a pivot shaft 244 pivotably mounted in compartment 36. The arm 242 is provided with cam follower 246 which follows cam 240. The arm 242 is secured to one end of cable 248. The cable is secured over cable roller 250 through bridge section 38 to drive arm 252. Drive arm 252 is secured to rotate with shaft 254, the latter being suitably journaled in the station 30 so as to pivot about its axis. Shaft 254 is provided at each end with a drive link 256. Links 256 drive the hold-up bar assembly 50. Specifically, each link is respectively secured to one end of a hold-up bar shaft 258, each shaft being secured at its other end to the mount arm 260. Arm 260 is in turn secured to the holdup bar 262. Compression springs 264 are each suitably connected at one end to each shaft 258, and its other end is secured to the lip 51 of partition 50 of supply station 30.

In operation, as cam 240 rotates with cam shaft 80, cam follower 246 follows cam 240 so that cam arm 242 pivots back and forth, pulling and releasing cable 248. When cable 248 is pulled arm 252 rotates shaft 254, causing shafts 258 to move, springs 264 to compress and the hold-up bar 262 to move toward to station 30. When cable 248 is released, compressed springs 264 cause bar 262 to move in the opposite direction toward the center of the belt 12, resulting in shafts 258 moving and links 256 and arm 252 rotating with shaft 254.

Figure 4:
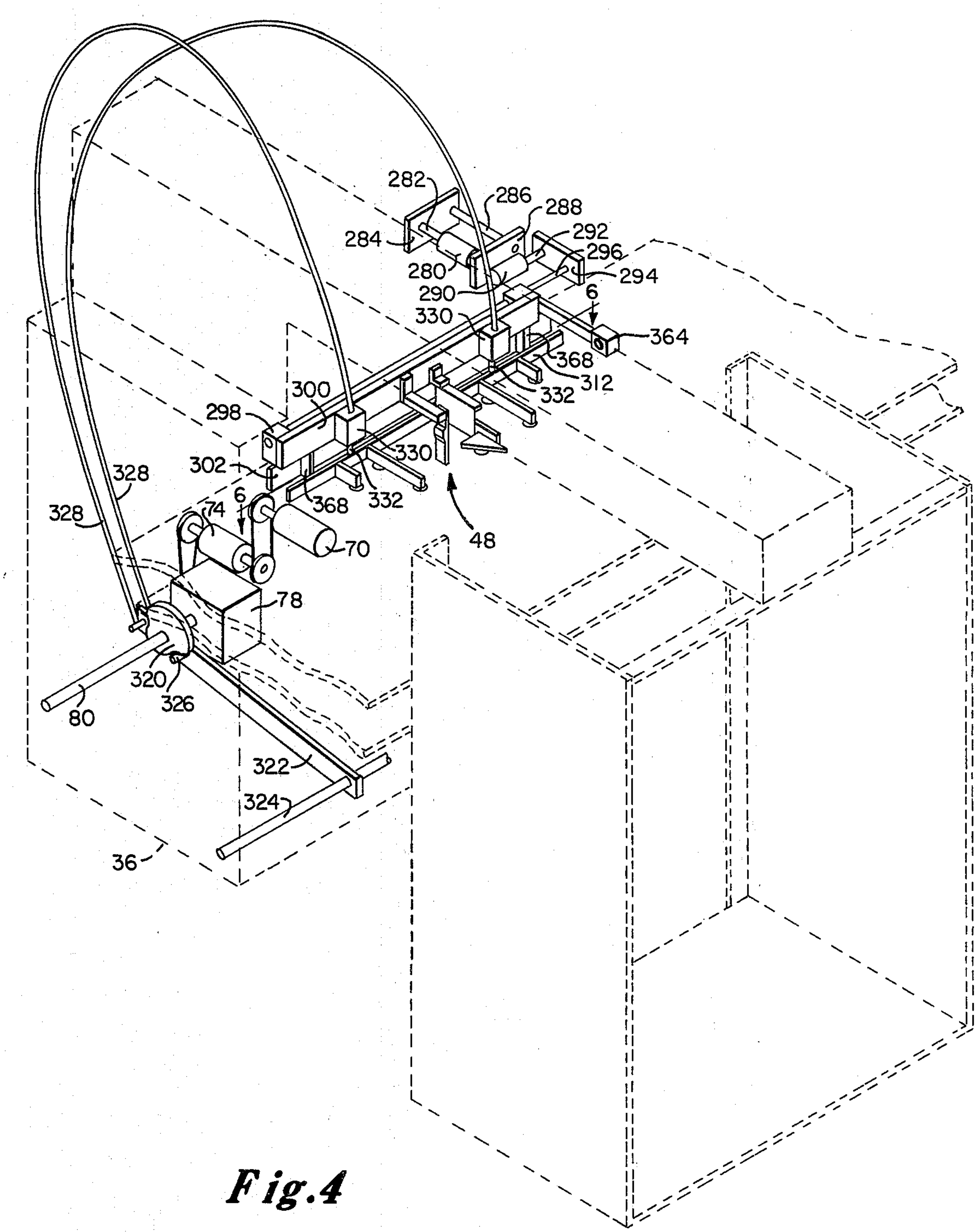
FIG. 4 is a perspective view, partially in schematic form, of the plunger drive mechanism of the laminating apparatus employing the present invention.

Referring to FIG. 4, the articulating frame 48 and the means for moving the frame are shown schematically. Frame 48 is adapted to be moved in either one of two directions in a plane parallel to the moving belt 12, and a portion of the frame is adapted to be moved toward and away from the belt 12. More particularly, movement of the frame within a plane parallel to the belt 12 is achieved in accordance with the teachings of U.S. Pat. No. 3,522,129. At least one hydraulic cylinder 280 is mounted in a stationary manner with respect to compartment 36. Cylinder 280 has a retractable piston 282 secured to block member 284, which in turn is connected to shaft 286. Shaft 286 is secured to block 284 so that its axis is parallel to the direction of travel of piston 282 and block 284 moves with movement of piston 282. Shaft 286 is secured to a second block member 288 which supports at least one other hydraulic cylinder 290, the latter having a retractable piston 292 connected to a second block 294. Block 294 is secured to shaft 296 which is connected to frame section 298. The orientation of the axis of shaft 296 is parallel to the direction of travel of piston 292 while being normal to the direction of travel of piston 282. Frame section 298 moves with piston 292. Frame section 298 includes a main frame member 300 and an alignment bar 302 supported by support arms 304 (see FIG. 11A).

Figure 11B:
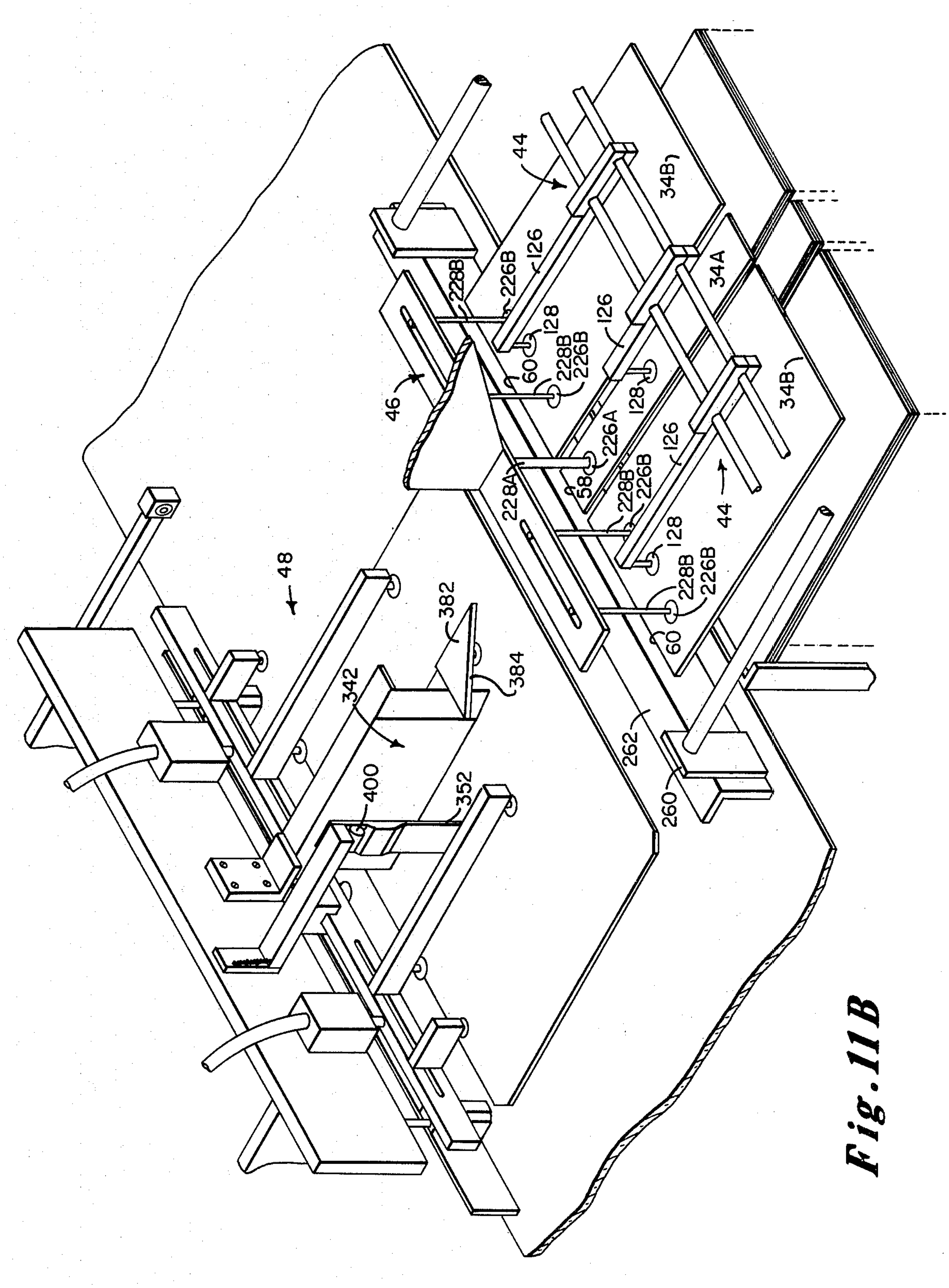
Figure 11C:
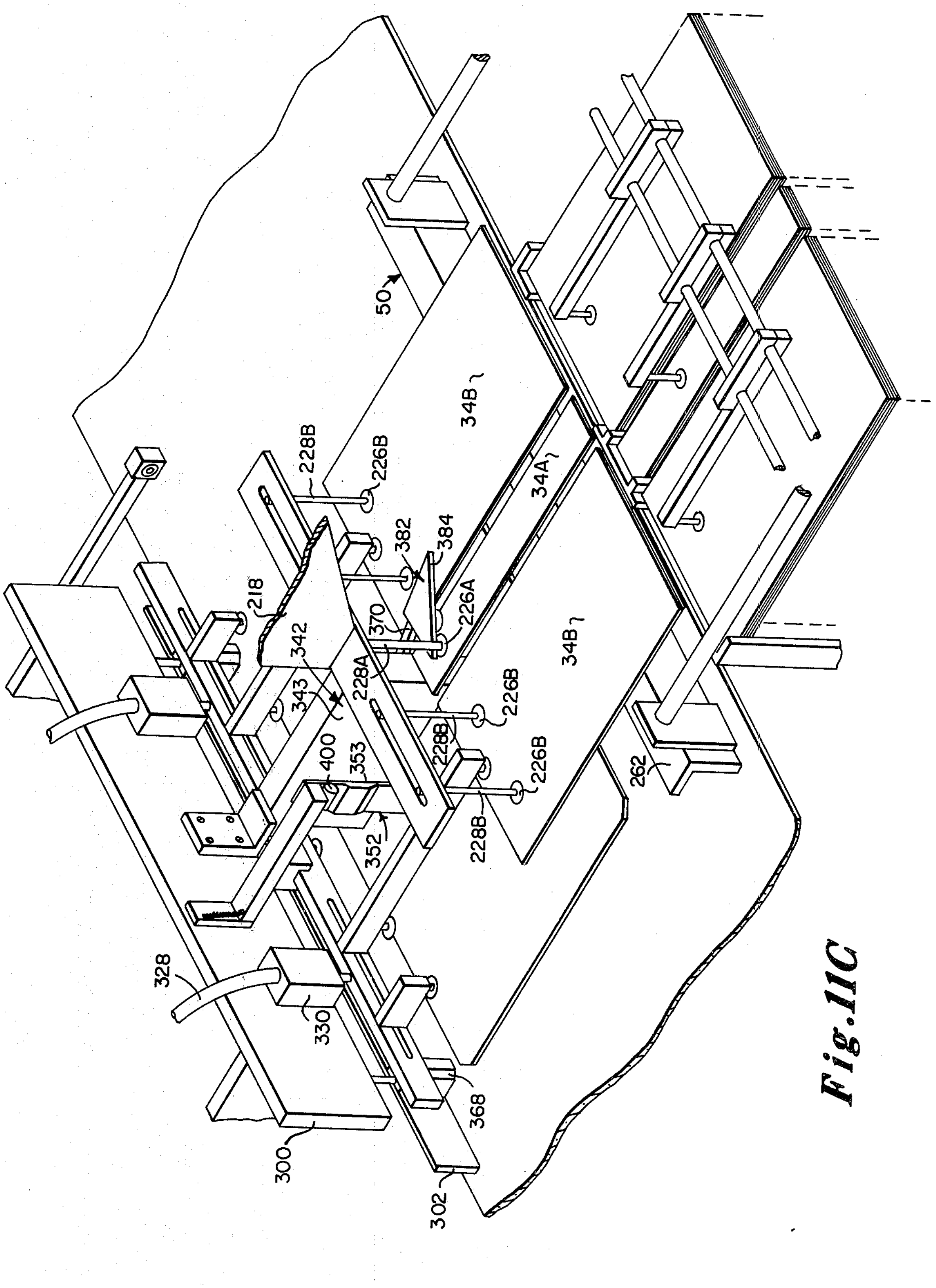
Figure 11D:
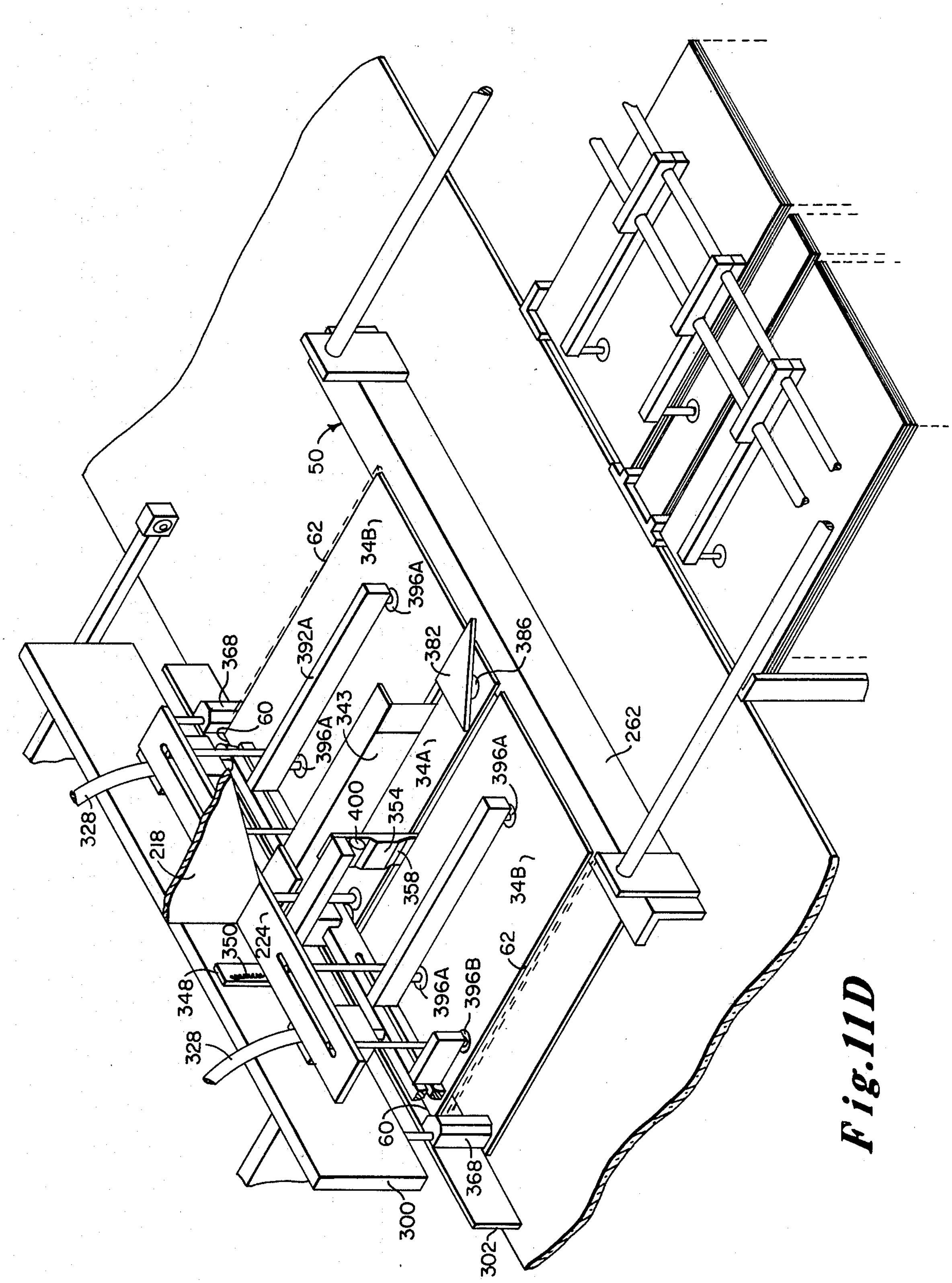
Figure 11E:
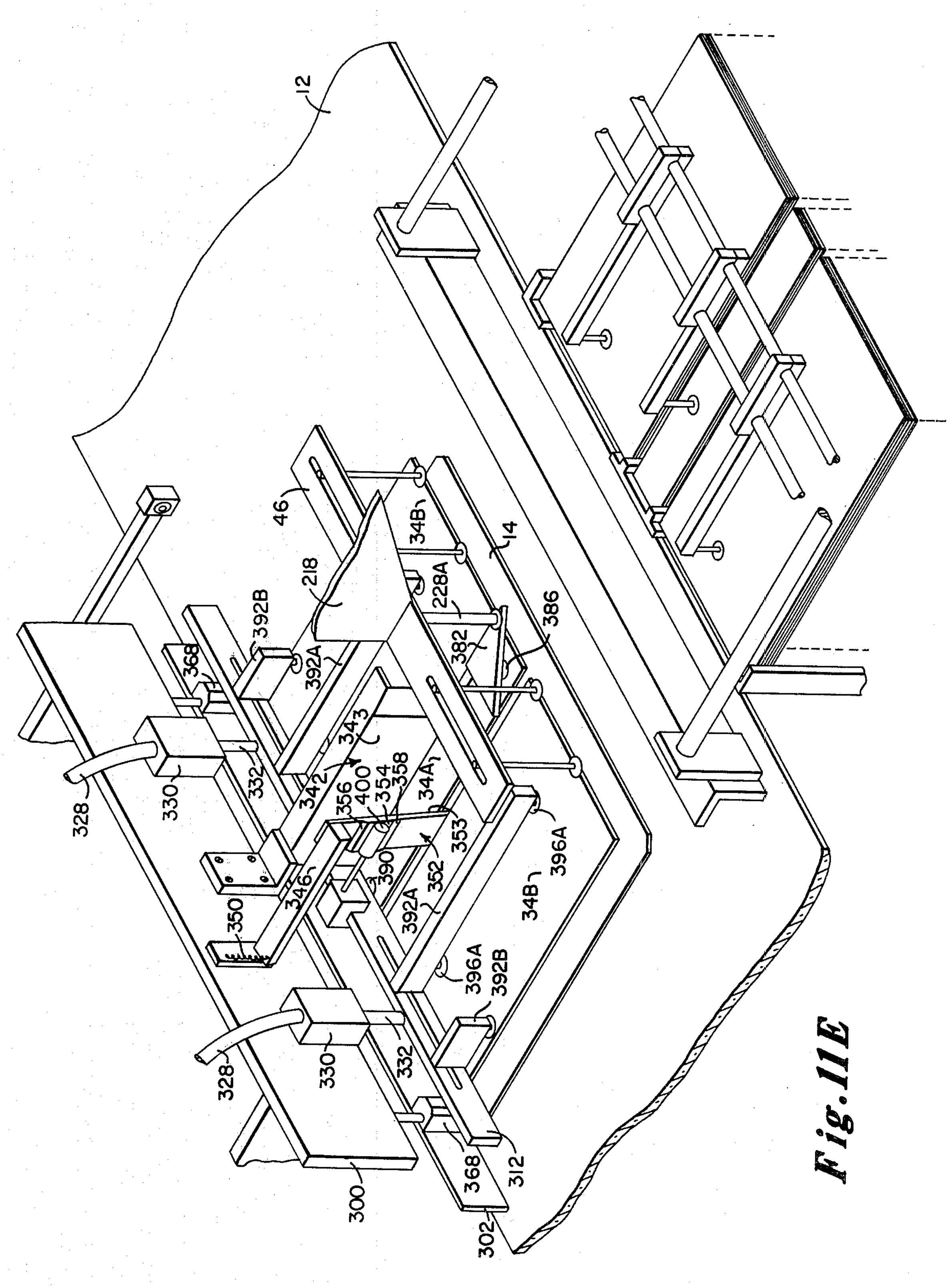
Figure 11F:
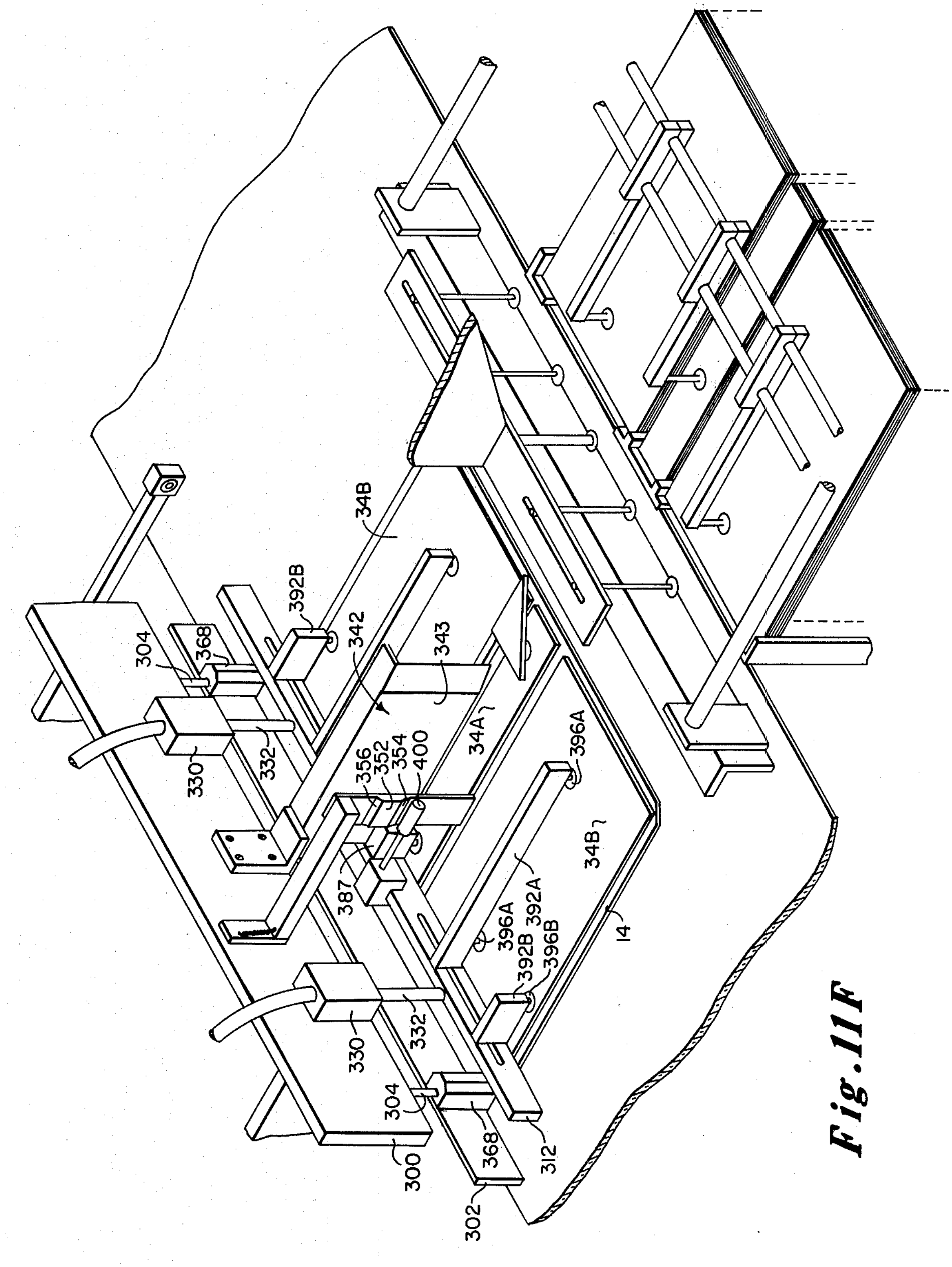

Section 298 also includes plunger bar 312, which is generally shown in FIG. 4, and more clearly shown in FIGS. 11A–11F, with FIG. 11F providing the best view. Bar 312 is mounted with respect to main frame member 300 for reciprocal movement between the belt 12 and the member 300. As shown in FIG. 4, movement is provided by virtue of cam 320 rotably mounted on cam shaft 80. A plunger cam arm 322 includes a pivot shaft 324 pivotably mounted in compartment 36 and the cam follower 326. Cam follower 326 is suitably secured to the wire of each cable 328, while the sheath of the cable is suitably secured within compartment 36 to allow movement of the wire of the cable within the sheath with movement of follower 326. The opposite ends of the sheaths of cables 328 are secured to top frame member 300 at 330, while the wire of each cable is suitably secured to rod 332. The latter is adapted to move along its axis with movement of the wire of the corresponding cable 328 with respect to its sheath as best shown by a comparison of FIGS. 11A-11E with that of FIG. 11F.

Referring to FIG. 11A the main frame member 300 includes a bracket 340 for supporting the upper edge of a substantially planar locating plate 342, the latter being connected so that its general plane is substantially normal to both the belt 12 as well as the direction of movement of the belt. The plate 342 is beveled on one side 343 at the edge 344 of the plate closest to the station 30.

Figure 8:
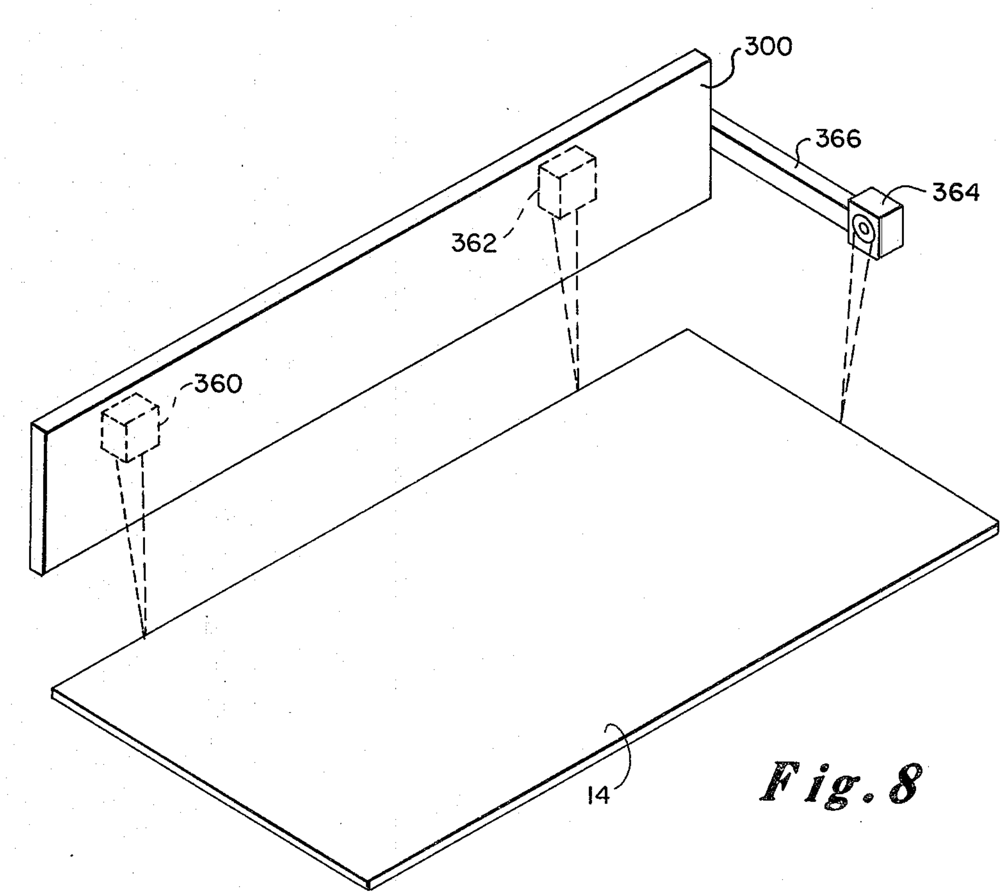
FIG. 8 is a perspective view of details of the main frame member, partially cut away, of the articulating frame.

A crowding plate support bar 346 is also secured to frame member 300. Specifically, bar 346 is secured by bracket 348 to the member 300 so that its elongate dimension extends substantially parallel to the general plane of locating plate 342, and so that it is rotatable, at least to a limited extent about its elongated axis, against the action of spring 350. The opposite end of bar 346 supports the top of a crowding bar or plate 352, the latter including a substantially flat side 353 (shown in FIG. 6) substantially parallel to and confronting the side 343 of locating plate 342. Again referring to FIG. 11A, a raised land portion 354, ramped above and below respectively at 356 and 358, is provided in the approximate center of crowding plate 352 on the side of the crowding plate opposite its flat side 353. Finally, in accordance with the teachings of U.S. Pat. No. 3,522,129 a pair of light source light detector units 360 and 362 are suitably secured at spaced apart locations to the rear of frame member 300 (see FIGS. 6 and 8), while an arm 366 extends from the frame member 300 over the belt 12 where it supports a third light source-light detector unit 364. Units 360, 362 and 364 are all identical and are of a type shown in U.S. Pat. Nos. 3,400,031 and 3,522,129. As schematically shown in FIG. 8, each generally provides a beam of light directed down onto the belt 12, where some of the light is reflected back toward the same unit. As suggested in the above-identified patents, the source of each unit projects a beam of light toward the belt 12 below. The beam is directed at the belt at an angle of incidence such that the detector of the unit is positioned to receive reflected light where the beam strikes the belt. The belt 12 is made of a light absorptive material and the wrapper 14 is made of a more reflective material than the belt. The threshold of each detector of each unit 360, 362 and 364 is set so that insufficient light (below the detector threshold) is reflected to the detector when the entire light beam strikes the belt below, while sufficient light (above the threshold of the detector) will be reflected to the detector when the beam strikes a portion of (i.e., the edge of) the wrapper. As described in U.S. Pat. No. 3,522,129, hydraulic cylinder 280 (of FIG. 4) is operated to move the assembly 48 until units 260 and 262 detect an edge of the wrapper positioned on the belt below, as schematically illustrated in FIG. 8. The cylinder 290 (of FIG. 4) is then operated until unit 364 locates the adjacent edge, also shown in FIG. 8.

Figure 6:
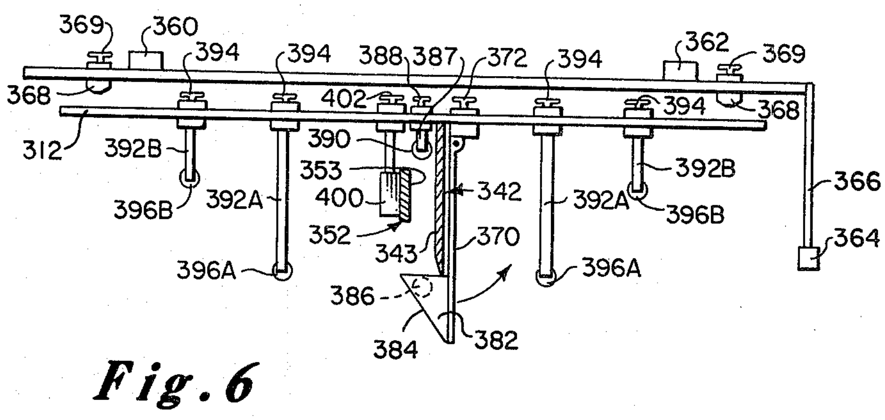
FIG. 6 is a cross-sectional view taken along line 6—6 of FIG. 4.

As shown in FIGS. 4, 6 and FIGS. 11A–11F a pair of camming or "plow" elements 368 are positioned on the alignment bar 302 by suitable means such as bolts 369 (see FIG. 6). The spacing between plow elements 368 is set to a preselected distance equal to that prescribed spacing between the outer oppositely disposed edges 62 of the two backing members 34B on the finished laminate 18. As best seen in FIG. 11F, at least that portion of the bar 302 between elements 368 is provided with a planar surface. This planar surface is adapted to cooperate with the leading edges 58 and 60 of members 34 as they are moved into position by the transport assembly as shown in FIG. 11E, so that the leading edges are all perfectly aligned.

Referring to FIGS. 6, 7A and 7B and FIGS. 11A–11F, the plunging bar 312 supports a center arm 370, the latter being suitably secured by, for example, bolt 372 to the plunging bar 312 and positioned adjacent the locating plate 342 when the plunging bar is in its upper position. Arm 370 is mounted for pivotable movement about the axis 374 between the 90° position shown in in FIG. 7A and the angled position shown in FIG. 7B. Spring means 378 is suitably provided for biasing the arm 370 to the 90° position, and stop means, such as the bracket 380 shown, prevents the arm 370 from pivoting beyond the 90° position. The end of arm 370 opposite axis 374 is provided with a camming element 382 having the camming edge 384, and a vacuum cup 386 (shown in phantom in FIG. 6 and shown in FIG. 11A) disposed underneath the camming element 382. A shorter center rod 387 (see FIGS. 6 and 11F) is attached to bar 312 by any suitable means such as bolt 388. The rod 386 extends toward the cam element 382 and is provided with vacuum cup 390 (shown in FIG. 6) spaced between cup 386 and alignment bar 302.

Bar 312 also supports a pair of arms 392A and 392B on each side of center arm 370. Each arm 392A and 392B is secured to the bar 312 by any suitable means such as bolts 394 so that the arms extend transversely from the bar. The end of each arm 392A and arm 392B is provided with a vacuum cup 396, with the cups 396A provided on arms 392A being disposed at a greater distance from alignment bar 302 than the cups 396B provided on arms 392B. All of the cups 386, 390 and 396 are disposed substantially in the same plane. The plane of the cups 386, 390 and 396 is substantially parallel to the belt 12 and is disposed above at least a portion of the alignment bar 302 when the plunging bar 312 is in its upper position. In this upper position the cups 386, 390 and 396 are also in the same plane as the cups 226 of the transport assembly 46.

A camming pin 400 is secured to bar 312 by any suitable means such as bolt 402 (see FIG. 6) and positioned so as to engage crowding plate 352. Pin 400 is adapted to move with bar 312 from its upper position where the pin 400 engages the crowding plate 352 above the ramp 356 (see FIGS. 11A–11D) to a middle position where pin moves over ramp 356 to engage raised land portion 354 (see FIG. 11E) to a lower position where the pin moves over lower ramp 358 to a position below ramp 358 (see FIG. 11F), and back up to the upper position.

Referring to FIG. 9, the vacuum system generally includes a vacuum pump 410 suitably connected through each of the valves 412A, 412B and 412C to the respective set of pick-up vacuum cups 128, transport vacuum cups 226 and plunger vacuum cup 386, 390 and 396. Valves 412A, 412B and 412C are controlled by a cam or cams provided on cam shaft 80 in a manner well known in the art so that vacuum is applied to the respective cups in accordance with the timing diagram shown in FIG. 10, and as will be more evident from the following description.

The operation of the apparatus in connection with FIGS. 11A–11F and the vacuum system of FIG. 9, will facilitate an understanding of both the apparatus and method of the present invention.

Referring to FIG. 11A, the backing sheet members 34 are positioned in three stacks on the tray 32 of compartment 30, with the center stack of members 34A being disposed between the other two stacks of members 34B. The center stack of members 34A is properly positioned on the tray 32 by disposing the leading edges 58 of the members 34A between the spaced apart ribs 56 of plate 54. Similarly, the remaining stacks of members 34B are positioned so that their leading edges 60 of the members of each stack are disposed between a rib 56 of the plate 54 and spacing element 42. When properly positioned, the outer edges 62 of the members 34B of one stack are spaced from the outer oppositely disposed edges 62 of the members 34B of the other stack by a predetermined distance slightly greater than the preselected distance between the plow elements 368 on alignment bar 302.

As each cycle begins, a wrapper 14 has been provided from the gluer 10 on belt 12. At the beginning of the cycle the wrapper is moving into position in the laminating station 16. As the wrapper approaches a position under the articulating frame assembly 48, the cam shaft 80 rotates to a position causing the pick-up assembly 44 to operate. Specifically, arms 126 move downwardly to a point where the pick-up vacuum cups 128 contact the front of each of the respective sheet members 34 as shown in FIG. 11A. At this point in time shaft 80 is at a position where the valve 412A is closed and a vacuum is applied to pickup cups 128, so that the top member 34 of each stack is held by a cup. Simultaneously, with the operation of the pick-up assembly 44, the shaft 80 moves to a position where the transport assembly 46 reaches its furthest position over each stack of members 34.

The transport assembly 46 remains substantially in this position momentarily and long enough for the shaft to move to a position where arms 126 pivot upwardly pulling the lead edge 58 or 60 of the respective top member 34 of each of the stacks (since it is held by a vacuum through vacuum cups 128) so that the front end of each top member contacts the respective transport vacuum cups 226 of the transport assembly 46 as shown in FIG. 11B. At this point in time the valve 412B is closed and a vacuum is applied to cup members 226 so as to hold the respective members 34. Shortly after the valve 412B is closed and a vacuum applied to transport vacuum cups 226, the valve 412A is open and cups 126 are released.

The cam shaft 80 continues its rotation causing transport assembly to move toward the articulating frame 48, pulling the members 34 held by cups 226. As the three members 34 are pulled over belt 12, the cam shaft 80 reaches a position where the hold-up bar 262 begins to move towards its extended position over the belt 12 supporting the trailing end of the three members 34 being transferred by transport assembly 44 (see FIGS. 11C and 11D) so that the trailing ends do not fall onto the belt.

As the transport assembly approaches the position shown in FIG. 11C the center cup holder 228A, made of a rigid material, hits the cam edge 384 of camming element 382. As the transport assembly continues to move the center bar 370 pivots about axis 374 against spring 378. Bar 370 continues to pivot (as illustrated in FIGS. 7A and 7B) until the holder 228A clears element 382, whereupon the bar 370 moves back to its 90° position with the plunger cup 386 now positioned over the center sheet member 34A. The sheet members move toward the alignment bar 302, with the center sheet member 34A disposed between the mutually confronting surfaces 343 and 353 of the locating and crowding plates 342 and 352, respectively. The members 34A and 34B still freely move with transport assembly 44 toward the bar 302 until the corner of each member 34B formed by leading edge 60 and outer edge 62 contacts the respective plow element 368. This occurs since the original spacing of the opposing edges 62, when the members 34B were stacked on tray 32, was deliberately made slightly greater than the spacing between elements 368.

In accordance with the principles of the present invention as the leading edge 58 and 60 of the members move into contact with the bar 302, the two outer members 34B move laterally, substantially in their plane, due to the camming action of the corners formed by the edges 60 and 62 and the respective plow elements 368 so that the opposing edges 62 are moved from the position shown by the dotted lines in FIG. 6D to the position shown in that Fig. It should be appreciated that the lateral movement of the members 34B is possible while simultaneously holding the members with the vacuum cups 226 of the transport assembly 44 due to the flexible nature of the cup holders 228B. As the members 34B are moved laterally by plow elements 368, the leading edges 58 and 60 are moved into contact with alignment bar 302 so that the leading edges will all be perfectly aligned. The members 34 are now in their relative positions and the outer oppositely disposed edges 62 are at the preselected distance as prescribed for the laminate 18.

Once in the position of FIG. 11D transport assembly 44 slows down and momentarily stops, whereupon the plunging bar 312 moves to a position shown in FIG. 11D, where the pin 400 moves over ramp 356 onto the raised land portion 354 forcing the crowding plate 352, by virtue of bar 346 pivoting about its axis, against the edge of the center sheet member 34A. This results in the member 34A being gripped and held between sides 343 and 353 of the locating plate 342 and crowding plate 352, respectively. Further, the center member 34A is precisely centered with respect to the two outer members 34B. This occurs due to the fact that by gripping the center member 34A between the sides 343 and 353 of plates 342 and 352, respectively the center member 34A is oriented precisely at 90° to the aligned edges 60 of the other two, outer members 34B. By centering the center member 34A, the leading edge 58 of the center member 34A will remain substantially aligned with leading edges 60 of the other two members 34B, assuming center member 34A is made with square corners. As pin 400 moves onto raised land portion 354 the vacuum cups 386, 390 and 396 of the plunger assembly move into contact with the respective members 34. The valve 412C of the system of FIG. 9 is then opened and a vacuum is applied to plunger cups 386, 390 and 396 to hold the members. Once held by cups 386, 390 and 396, the three sheet members are all supported in a substantially coplanar position parallel to and spaced from the wrapper 14 which is now positioned below with belt 12 coming to a stop. Shortly after valve 412C is opened, the valve 412B is closed and the cups 226 of the transport assembly are released. Further, the cam shaft 80 is now in a position where the hold-up bar 262 begins to retract back toward station 30. The transport assembly also moves back toward the station 30 to pick up the next set of members 34. In this regard since the plunging bar 312 has moved down to the intermediate position shown in FIG. 11E, the center cup 226A and cup support 228A of the transport assembly 46 will travel above the camming element 382 as shown in FIG. 11E.

As the cam shaft 80 continues to rotate, the entire articulating frame 48 is moved as previously described in each of two perpendicular directions so that the light beam of each unit 360 and 362 locates one edge of wrapper 12 below and the unit 364 locates an adjacent edge of the wrapper as shown in FIG. 8. Once the edges of wrapper 12 are properly located, the three sheet members 34 are spatially aligned with the respective portions of the wrapper to which they are to be laminated.

As the cam shaft 80 continues to rotate the plunging bar 312 moves further down where pin 400 moves off land portion 354 down over ramp 358 to a point below as shown in FIG. 11F. This will release crowding plate 352. Spring 350 causes the plate to release its grip on the center member 34A so that the member will move with the bar 312. The bar 312 moves downwardly forcing the three members 34 onto the respective portions of the wrapper 14 as shown in FIG. 11F. The valve 412C of FIG. 9 is then opened so that vacuum cups 386, 390 and 396 of the plunging bar assembly are released. The plunging bar 312 is then pulled back to its upper position of FIG. 11A, the belt 12 is again energized so that the next wrapper 14 begins to move into position and the cycle begins again.

The foregoing apparatus and the method described is an improved, automatic and yet inexpensive apparatus for and method of making laminate articles. It is particularly useful in the manufacture of bookcases where the center backing member 34A forms a spine support while the other backing members 34B form the front and back supports. The center backing member will be precisely centered between the other two. Since the opposing edges 62 of the members 34B are precisely spaced from one another and one edge of the wrapper 14 and the leading edges 58 and 60 are aligned with one and an adjacent edge of the wrapper 14, the edges of the front and back covers of the resulting bookcase will be precisely located with respect to any preprinted material on the final bookcase. Alternatively, the wrapper will be precisely wrapped around the sheet members, and the information printed on the bookcase after the laminate is wrapped. It should be appreciated that the present invention lends itself to a number of different applications and is not intended to be limited to making bookcases.

Since certain changes may be made in the above apparatus and method without departing from the scope of the invention herein involved, all matter contained in the above description shall be interpreted in an illustrative and not in a limiting sense.

What is claimed is:

1. A system for registering and securing, in a predetermined relation, three substantially planar sheet members, each to a different portion of a surface of a sheet of material such that one of said sheet members is disposed between the other two sheet members, said system comprising:

- support means for supporting said sheet of material;
- means for moving said three sheet members each from a first location to a second location wherein each of said sheet members is disposed at said second location in a plane substantially parallel to said sheet of material;
- means at said second locations for centering said one sheet between and with respect to said other two sheet members;
- means at said second location for registering said three sheet members with respect to the respective portions of said surface of said sheet of material; and
- plunging means for moving said members from said second location into contact with the respective portions of the surface of said sheet of material.

2. A system according to claim 1, wherein said means for registering includes means for substantially aligning one edge of each of said sheet members when said members are moved into said second location.

3. A system according to claim 2, wherein said means for centering includes means for gripping said one sheet member after said members are moved into said second location so a orient said one member substantially 90° with respect to the aligned edges of said other two sheet members, prior to moving said members from said second location into contact with the respective portions of the surface of said sheet of material.

4. A system according to claim 2, wherein said other two sheet members are secured to said sheet of material such that the outer oppositely disposed edges of said other two sheet members are mutually spaced from one another by a predetermined distance, said system further including means cooperating with said other two sheet members for moving said other two sheet members within their planes as said other two sheet members are moved into said second location so as to move the outer oppositely disposed edges of said other two sheet members relative to one another so that said outer oppositely-disposed edges are mutually spaced from one another by said predetermined distance.

5. A system according to claim 4, wherein said means for moving said three sheet members moves said sheet members so that said one edge of each of said sheet members is the leading edge as each said sheet member is moved into said second location, and said means for aligning said one edges of said members includes an alignment bar, wherein said one edges are moved into contact with a surface of said alignment bar as said members are moved into said second location.

6. A system according to claim 5, wherein said means cooperating with said other two sheet members includes a pair of camming elements secured to said bar and spaced apart by said predetermined distance, said other two sheet members being adapted to respectively contact and move substantially in their planes as said other two members are moved into said second location.

7. A system according to claim 4, further including member supporting means for supporting each of said sheet members at said first location, transport means movable between a first position above said first location and a second position above said second location, for transferring said three members from said first location to said second location, and means for lifting at least the leading edges of each of sheet members from said member supporting means to said transport means while said transport means is at said first position.

8. A system according to claim 7, further including means for supporting the trailing edge of each of said members as said members are moved from said first location to said second location.

9. A system according to claim 7, wherein said means for lifting said leading edges of each of said sheet members includes first vacuum means adapted to releasably hold said members by vacuum, and said transport means includes second vacuum means adapted to releasably hold said members by vacuum prior to the release of said first vacuum means and while transferring said members from said first location to said second location.

10. A system according to claim 9, wherein said plunging means includes third vacuum means adapted to releasably hold said members by vacuum prior to the release of said second vacuum means and while said members are moved from said second location into contact with said sheet.

11. A system according to claim 10, further including means for moving said plunging means at said second location relative to said sheet so as to position said members relative to two adjacent edges of said sheet.

12. A system according to claim 10, wherein said third vacuum means includes a pivotable rod supported by said plunging means, said pivotable rod being movable by said transport means as said transport means is moved from said first position to said second position, said plunging means moving toward said sheet as said transport means moves from said second position to said first position so that said transport means clears said pivotable rod.

13. A system according to claim 7, wherein said transport means includes flexible means for supporting said other two sheet members so as to support said two members while allowing said other two members to move within their planes as said other two members move into said second location.

14. A system according to claim 13, wherein said flexible means includes flexible holder means for supporting said second vacuum means.

15. A system according to claim 4, further including means for spacing said opposite edges of said members in said first location at a distance greater than said predetermined distance.

16. A method, for use in making a bookcase, of laminating a pair of substantially planar cover sheet member and a spine sheet member to one surface of a wrapper, said method comprising the steps of:

positioning said cover sheet members and said spine sheet member at a first location so that said spine sheet member is disposed between said cover sheet members and the opposing edges of said cover sheet members are mutually spaced at a distance greater than a preselected distance dependent upon the size of said bookcase;

moving said sheet members to a second location spaced from said first location and spaced from said surface of said wrapper, wherein said cover and spine backing sheets are each disposed in a registered and spaced relationship from the corresponding portion of the surface of said wrapper to which said sheet member is to be secured, said spine sheet member being centered between said cover sheet member and said cover sheet members being moved relative to one another within said plane so as to space the opposing edges of said cover backing sheets at said preselected distance as said cover backing sheets are moved from the first location to the second location; and moving said sheet members relative to the surface of said wrapper so as to secure said sheet members to the respective portions of the surface of said wrapper.

17. A method according to claim 16, wherein said step of moving said sheet members to said second location includes the steps of moving said sheet members so that each has a moving leading edge, and substantially aligning said leading edge of each of said members as said members are moved into said second location.

18. A method according to claim 17, wherein said step of moving said sheet members to said second location includes the step of gripping said cover sheet member so that said cover sheet member is oriented substantially 90° with respect to the aligned edges of said cover sheet members.

19. A method according to claim 17, further including the step of positioning said leading edges of members in said second location with one edge of said wrapper and said outer opposing edges with an adjacent edge of said wrapper.

* * * * *

UNITED STATES PATENT AND TRADEMARK OFFICE

CERTIFICATE OF CORRECTION

PATENT NO. : 4336094

DATED : June 22, 1982

INVENTOR(S) : Leland Mills

It is certified that error appears in the above–identified patent and that said Letters Patent are hereby corrected as shown below:

Claim 1, Column 13, line 42, delete "locations" and substitute therefor -- location --;

Claim 3, Column 13, line 59, delete "a" and substitute therefor -- as to --.

Signed and Sealed this

*Seventh* Day of *September 1982*

[SEAL]

*Attest:*

GERALD J. MOSSINGHOFF

*Attesting Officer* *Commissioner of Patents and Trademarks*